(12) United States Patent
Chang et al.

(10) Patent No.: US 7,093,967 B2
(45) Date of Patent: Aug. 22, 2006

(54) BACKLIGHT MODULE

(75) Inventors: Che-Chih Chang, Taichung (TW); Han-Ping Kuo, Taipei (TW)

(73) Assignee: Au Optronics Corp., Hsinchu (TW)

( * ) Notice: Subject to any disclaimer, the term of this patent is extended or adjusted under 35 U.S.C. 154(b) by 142 days.

(21) Appl. No.: 10/728,830

(22) Filed: Dec. 8, 2003

(65) Prior Publication Data

US 2004/0190308 A1 Sep. 30, 2004

(30) Foreign Application Priority Data

Mar. 31, 2003 (TW) .............................. 92107318 A

(51) Int. Cl.
- *G01D 11/28* (2006.01)
- *F21V 17/04* (2006.01)
- *F21V 19/04* (2006.01)

(52) U.S. Cl. ...................... 362/560; 362/602; 362/606; 362/633

(58) Field of Classification Search .................. 349/58; 362/561, 632, 633, 634, 560, 602, 606, 607, 362/609, 624, 627

See application file for complete search history.

(56) References Cited

U.S. PATENT DOCUMENTS 5,889,572 A * 3/1999 Takahashi et al. ............. 349/58
6,870,582 B1 * 3/2005 Hayashimoto et al. ........ 349/58
6,902,285 B1 * 6/2005 Eiraku et al. ................ 362/561

FOREIGN PATENT DOCUMENTS

| CN | 1321910 | 11/2001 |
|---|---|---|
| JP | 11-095214 | 4/1999 |

* cited by examiner

*Primary Examiner*—Alan Cariaso
(74) *Attorney, Agent, or Firm*—Rabin & Berdo, PC

(57) ABSTRACT

A backlight module, at least includes an outer frame, a bottom frame, an upper frame, a reflector and a light source. The upper frame and the bottom frame are mounted within the outer frame and are removably coupled to each other. The upper frame is disposed above the bottom frame and the bottom frame can be separated from the outer frame when the backlight module is inverted. The reflector is disposed under the upper frame and on the bottom frame and the reflector can be removed after the bottom frame is separated from the outer frame. The light source disposed under the upper frame and above the reflector and the light source can be changed after the reflector is removed. This backlight module enables users to directly exchange the light source by just simply taking out the bottom frame and the reflector sequentially. By this, the damage of the display panel, the multilayer optical film and the light guide plate caused by hitting and scratching during the exchanging process is prevented.

12 Claims, 6 Drawing Sheets

US 7,093,967 B2

BACKLIGHT MODULE

This application claims the benefit of Taiwan application Ser. No. 92107318, filed Mar. 31, 2003.

BACHGROUND OF THE INVENTION

1. Field of the Invention

The present invention relates to a backlight module, and more specifically to a backlight module, of which the light source can be exchanged without taking out the display panel, the multilayer optical film and the light guide plate.

2. Description of the Related Art

A backlight module is very popular at the present time and is utilized in a great variety of electronic products such as liquid crystal displays (LCDs), cellular phones, personal digital assistants (PDAs), and the like. The backlight module provides a suitable amount of light or luminance to above-mentioned electronic products.

FIG. 1 is a schematic cross-sectional diagram of a conventional backlight module 100. Referring to FIG. 1, the backlight module 100 includes an iron frame 102, an upper plastic frame 104, a bottom plastic frame 106, a liquid crystal display panel (LCD panel) 108, a multilayer optical film 110, a cold cathode fluorescent lamp (CCFL) 112, a light guide plate 114, a reflector 116 and a lamp holder 118. Here, the lamp holder 118 is independent of and different from the reflector 116, or otherwise the lamp holder 118 is part of the reflector 116 and made by bending the two ends of the reflector 116.

FIG. 2 is a flow chart showing the assembling process of the conventional backlight module 100 shown in FIG. 1. Referring to FIG. 2, the assembling process is performed in the order from the step 202, 204, 206, 208, 210 to the step 212. During the step 202, the first step, the reflector 116 is mounted above the bottom plastic frame 106. And then at the step 204, the lamp holder 118, the CCFL 112 and the light guide plate 114 are disposed above the reflector 116 and all are mounted within the bottom plastic frame 106. Next, at the step 206, the multilayer optical film 110 is disposed above the bottom plastic frame 106, the lamp holder 118 and the light guide plate 114.

Further, at the step 208, the upper plastic frame 104 is positioned over the bottom plastic frame 106 and the multilayer optical film 110; the upper plastic frame 104 is removably fastened to the bottom plastic frame 106 with the respective protruding part thereof. At the step 210, the LCD panel 108 is disposed on the upper plastic frame 104 and the multilayer optical film 110. Then, at the step 212, the iron frame 102 is used to accommodate the upper plastic frame 104 and the bottom plastic frame 106; the upper plastic frame 104 and the bottom plastic frame 106 are sequentially coupled to the iron frame 102. So far, the backlight module 100 is completely assembled.

Light is emitted from the CCFL 112 and reflected by the reflector 116 when the backlight module 100 of FIG. 1 is operating. Then the light is guided by the light guide plate 114 and filtered through the multilayer optical film 110 to reach and penetrate the LCD panel 108. Then, the image is visible.

FIG. 3 is a flow chart showing the process of changing the cold cathode fluorescent lamp 112 in the conventional backlight module 100 when the performance of the cold cathode fluorescent lamp 112 deteriorates. Referring to FIG. 3, the exchanging process is performed in the order from the step 302, 304, 306, 308, 310, 312 to the step 314. During the step 302, the first step, separating the upper plastic frame 104 and the bottom plastic frame 106 from the iron frame 102 sequentially and removing the iron frame 102, are performed. Next, at the step 304, the LCD panel 108 is removed. And then at the step 306, the upper plastic frame 104 is separated from the bottom plastic frame 106 and the upper plastic frame 104 is removed. Further, at the step 308, the multilayer optical film 110 is removed. At the step 310, the lamp holder 118 is removed. Finally, at the step 312, the light guide plate 114 is removed and then, at the step 314, the deteriorated CCFL 112 is exchanged. The backlight module 100 can be re-assembled by following the reversed procedure of the process as shown in FIG. 3.

However, it is time-consuming to exchange the CCFL 112 of the conventional backlight module. Because the challenging procedure includes the complex steps of separating the iron frame 102 from the upper plastic frame 104 and the bottom plastic frame 106, and moving the LCD panel 108, the multilayer optical film 110, the lamp holder 118 and the light guide plate 114 sequentially. Alternatively, it is still time-consuming to exchange the CCFL 112 of the conventional backlight module when the lamp holder 118 is part of the reflector 116. The changing procedure includes the steps of: separating the iron frame 102 from the upper plastic frame 104 and the bottom plastic frame 106; moving the LCD panel 108, the multilayer optical film 110; moving the lamp holder 118 and the light guide plate 114 together when the lamp holder 118 is part of the reflector 116.

Another disadvantage of the conventional backlight module is that the LCD panel 108, the multilayer optical film 110, the lamp holder 118 and the light guide plate 114 can be subject to hit and scrape each other during the exchanging procedure of removing them.

SUMMARY OF THE INVENTION

In view of the foregoing, it is an object of the present invention to provide a backlight module enabling users to directly exchange the light source with great convenience by simply taking out the bottom frame and the reflector sequentially. By this, the damage of the display panel, the multilayer optical film and the light guide plate caused by hitting and scratching during the exchanging process is prevented.

An object of the present invention is to provide a backlight module at least including an outer frame, a bottom frame, an upper frame, a reflector and a light source. The upper frame and the bottom frame are mounted within the outer frame and are removably coupled to each other. The upper frame is disposed above the bottom frame. The reflector is disposed under the upper frame and on the bottom frame. The reflector can be removed after the bottom frame is separated from the outer frame. The light source is disposed under the upper frame and above the reflector, wherein the light source can be exchanged after the reflector is removed.

According to another aspect of the invention, a process of changing the light source in a backlight module. The backlight module at least includes an outer frame, an upper frame, a bottom frame, a reflector and a light source. The upper frame and the bottom frame are mounted within the outer frame and are removably coupled to each other. The upper frame is disposed above the bottom frame and the reflector is disposed under the upper frame and on the bottom frame. The light source is disposed under the upper frame and above the reflector. As for the exchanging procedure of replacing the light source, the backlight module is firstly inverted and the bottom frame is separated from the outer frame. Further, the bottom frame and the reflector are sequentially removed and then the light source is exchanged.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

The present invention aims to provide a backlight module enabling users to directly change the light source with great convenience by simply taking out the bottom frame and the reflector sequentially. By this, the damage of the display panel, the multilayer optical film and the light guide plate caused by hitting and scratching during the exchanging process is prevented.

Figure 1:
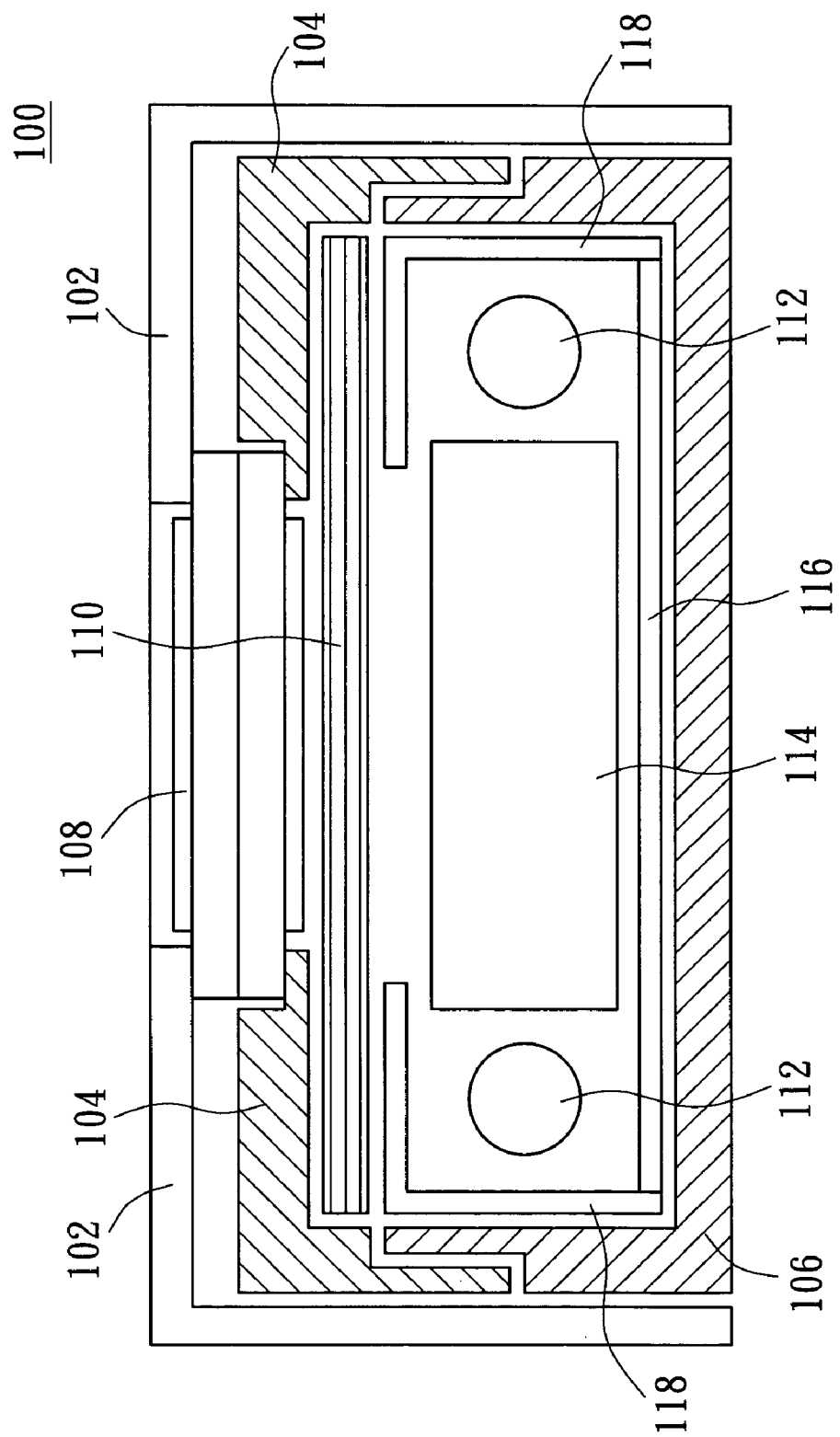
FIG. 1 is a schematic cross-sectional diagram of the conventional backlight module.
Figure 2:
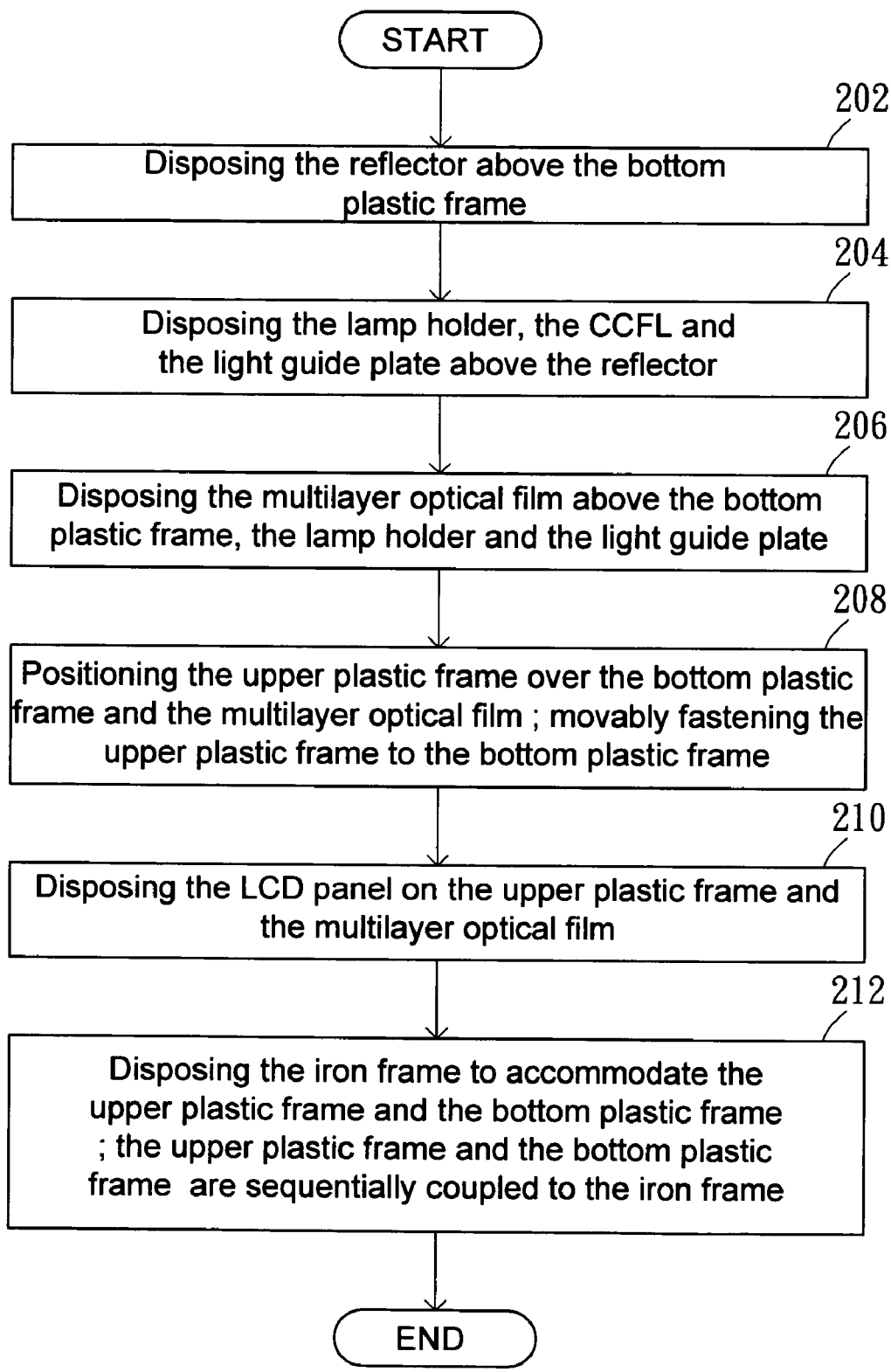
FIG. 2 is a flow chart showing the assembling process of the conventional backlight module according to FIG. 1.
Figure 3:
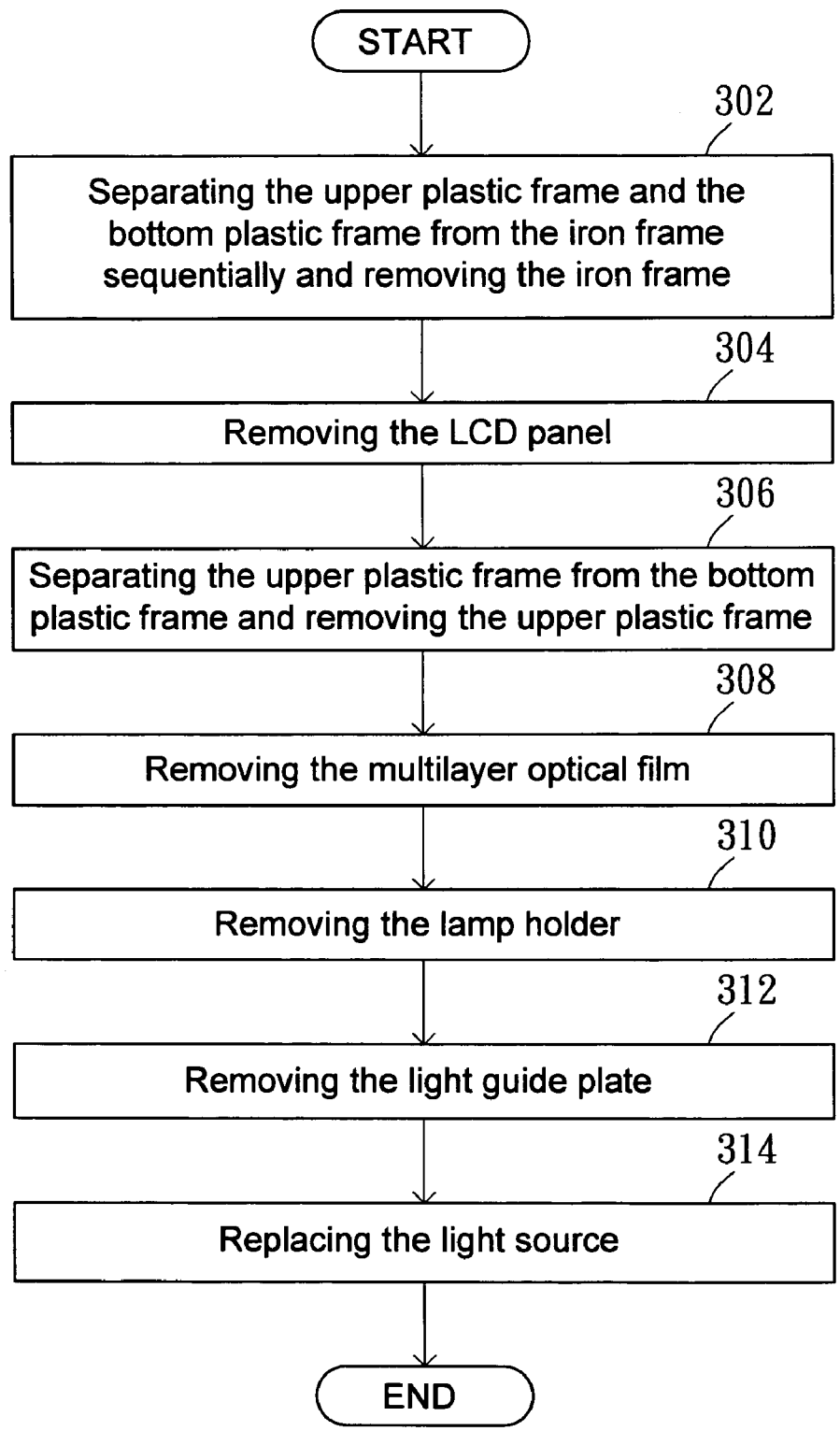
FIG. 3 is a flow chart showing the process of changing the cold cathode fluorescent lamp in the conventional backlight module according to FIG. 1.
Figure 4:
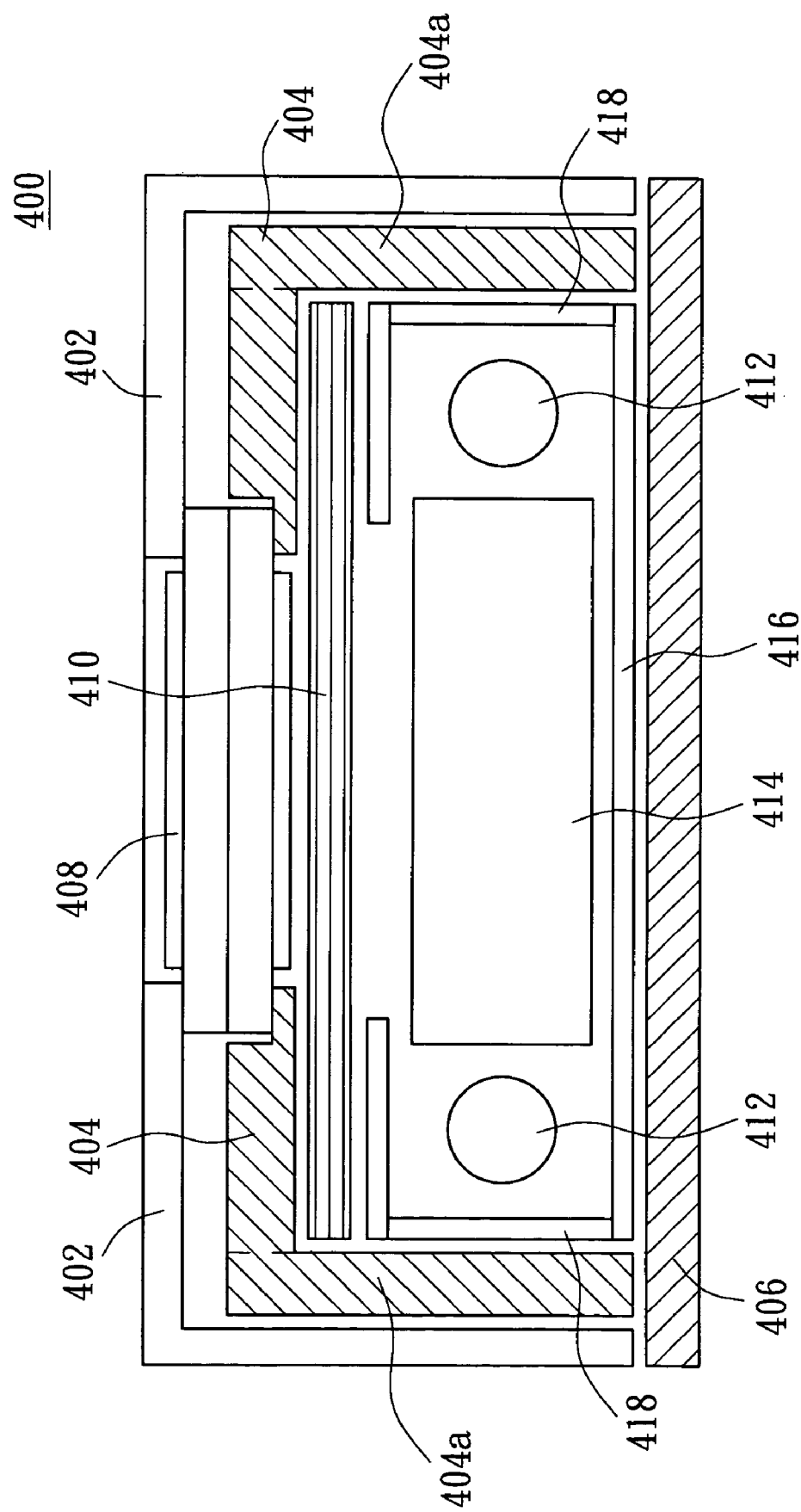
FIG. 4 is a schematic cross-sectional diagram showing the backlight module of the present invention.

FIG. 4 is a schematic cross-sectional diagram showing the backlight module of the present invention. Referring to FIG. 4, the backlight module 400 includes an outer frame 402, an upper frame 404, a bottom frame 406, a display panel 408, a multilayer optical film 410, at least a light source 412, a light guide plate 414, a reflector 416 and at least a lamp holder 418.

The upper frame 404 and the bottom frame 406 are both coupled within the outer frame 402. This invention is characterized by its specially design upper frame 404 and bottom frame 406 as well as their assembly. The vertical sides 404a of the upper frame 404 extend further down to substantially reach the bottom of the backlight module 400, which is different from the conventional structure. The conventional backlight module 100 includes an upper frame 104, which is removably fastened to the bottom frame 106 and is buckled with the bottom frame 106 at the mid of the backlight module 100. Thus, the bottom frame 406 according to the invention can be easily separated from the outer frame 402 when the backlight module 400 is inverted. Here, the lamp holder 418 is independent of and different from the reflector 416, or otherwise the lamp holder 418 is part of the reflector 416 and made by bending the two ends of the reflector 416. The reflector 416 is disposed under the upper frame 404 and on the bottom frame 406 and the reflector 416 can be removed after the bottom frame 406 is separated from the outer frame 402. The light source 412 is disposed under the upper frame 404 and above the reflector 416; the light source 412 can be changed simply after the reflector 416 is removed.

The light guide plate 414 is disposed under the upper frame 404 and above the reflector 416. The function of the light guide plate 414 is to guide the light reflected by the reflector 416. The lamp holder 418 is mounted within the upper frame 404 and is adjacent to the light guide plate 414. The lamp holder 418 functions to house the light source 418. The multilayer optical film 410 is disposed above the lamp holder 418 and the light guide plate 414 within the upper frame 404. The display panel 408 is disposed on the upper frame 404 and the multilayer optical film 410 within the outer frame 402. The light is guided by the light guide plate 414 and filtered through the multilayer optical film 410 to reach and penetrate the display panel 408. Then, the image is visible.

Figure 5:
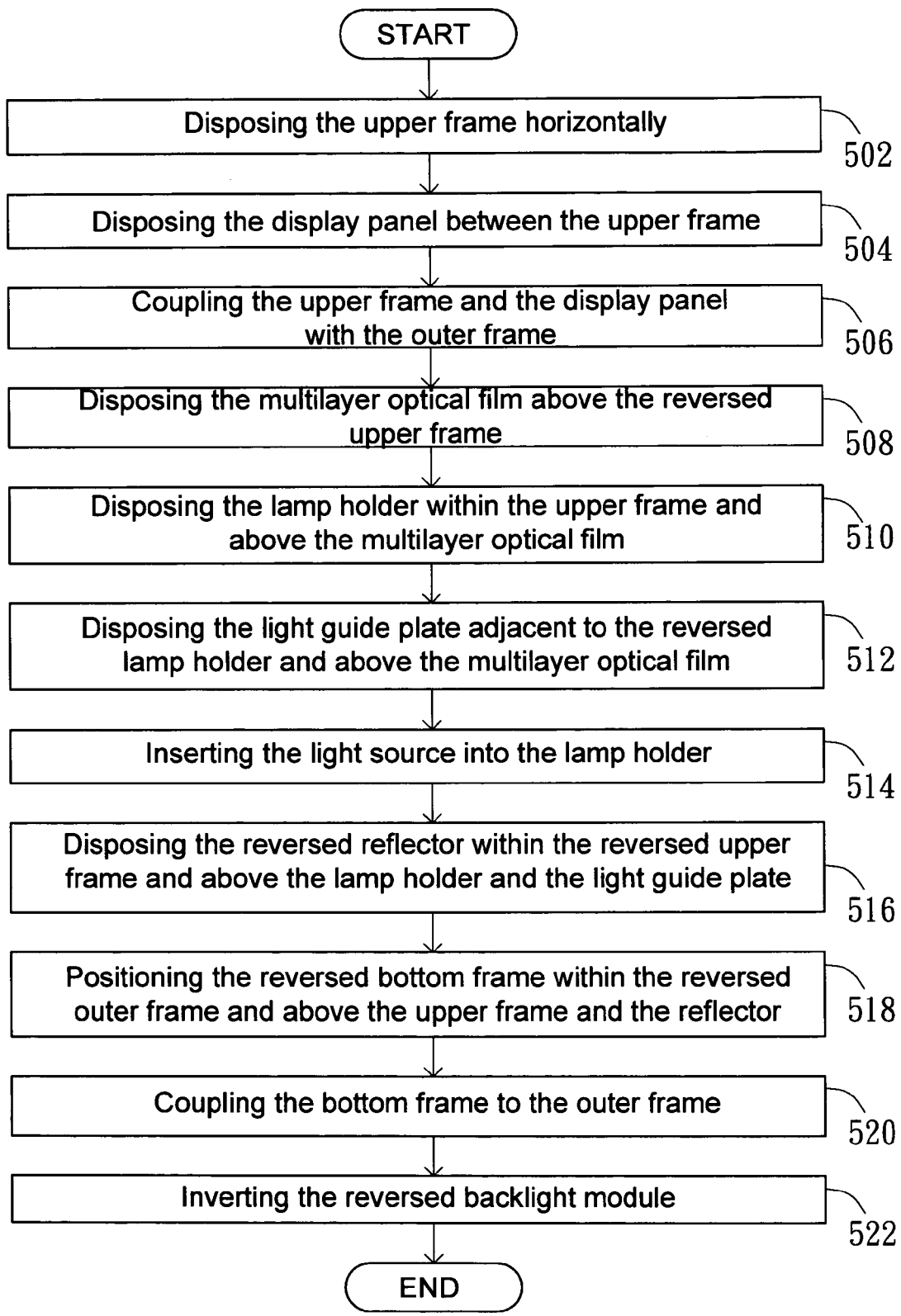
FIG. 5 is a flow chart showing the assembling process of the backlight module according to FIG. 4.

FIG. 5 is a flow chart showing the assembling process of the backlight module according to FIG. 4. Referring to FIG. 5, the assembling process is performed in the order from the step 502, 504, 506, 508, 510, 512, 514, 516, 518, 520 to the step 522. During the step 502, the first step, the upper frame 404 is disposed horizontally. And then at the step 504, the display panel 408 is disposed between the upper frame 404. Next, at the step 506, the upper frame 404 and the display panel 408 is removably coupled with the outer frame 402. At the step 508, the reversed multilayer optical film 410 is disposed above the reversed upper frame 404. At the step 510, the reversed lamp holder 418 is disposed within the reversed upper frame 404 and above the multilayer optical film 410.

Further, at the step 512, the reversed light guide plate 414 is disposed adjacent to the reversed lamp holder 418 and above the multilayer optical film 410. At the step 514, the light source 412 is inserted into the reversed lamp holder 418 and then at the step 516, the reversed reflector 416 is disposed within the reversed upper frame 404 and above the lamp holder 418 and the light guide plate 414. Then, at the step 518, the reversed bottom frame 406 is positioned within the reversed outer frame 402 and above the upper frame 404 and the reflector 416. At the step 520, the bottom frame 406 is removably coupled to the outer frame 402. As a result, the reversed backlight module 400 is completely assembled. At the step 522, after the reversed backlight module 400 is inverted, it shows the same feature as the one shown in FIG. 4.

Figure 6:
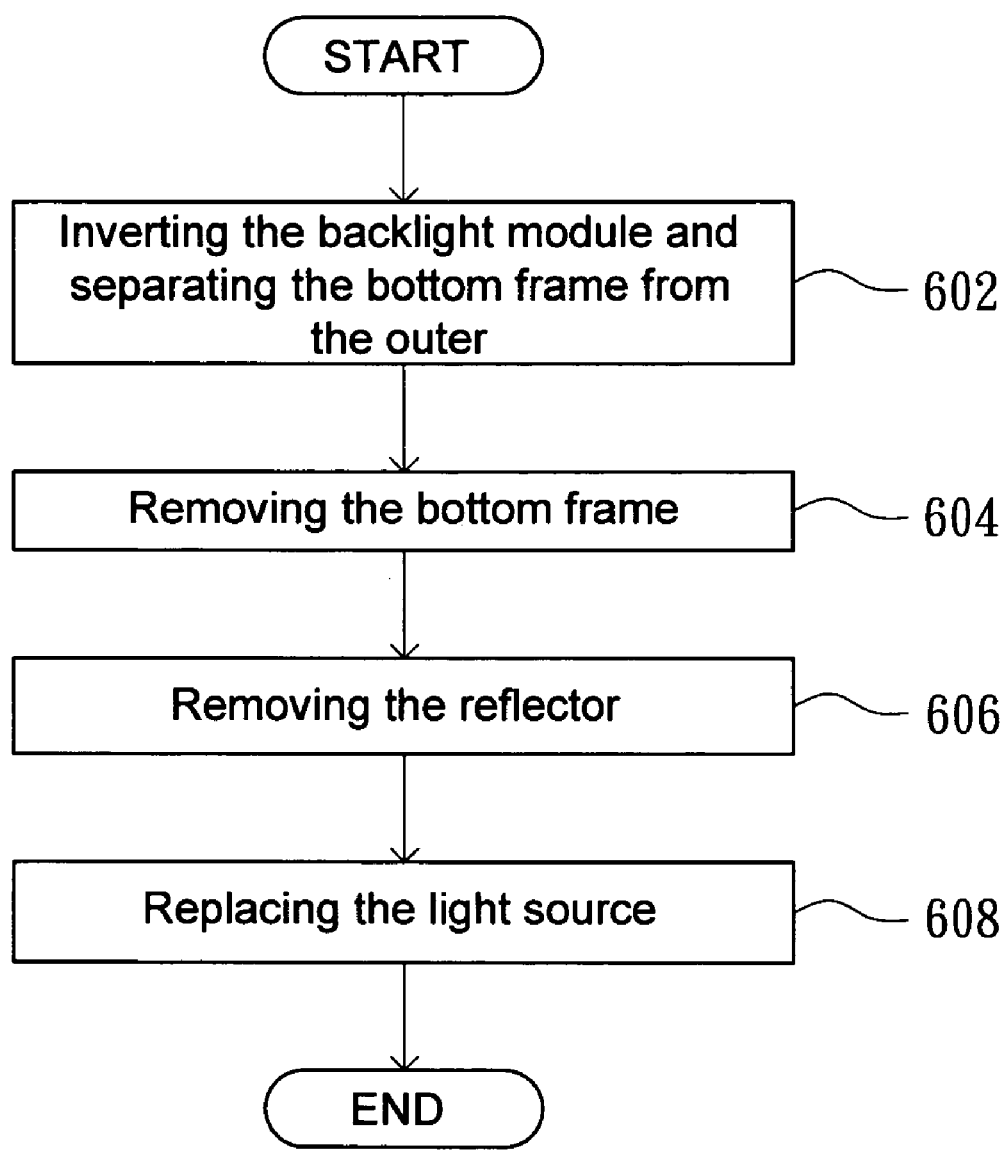
FIG. 6 is a flow chart showing the process of changing the light source in the backlight module of the present invention according to FIG. 4.

FIG. 6 is a flow chart showing the process of changing the light source in the backlight module of the present invention according to FIG. 4. Referring to FIG. 6, the process is performed in the order from the step 602, 604, 606 to the step 608 sequentially. During the step 602, the first step, the backlight module 400 is inverted and the bottom frame 406 is separated from the outer frame 402. Next, at the step 604 and 606, the bottom frame 406 and the reflector are removed, sequentially. Finally, at the step 608, the light source 412 is exchanged. The backlight module 400 can be re-assembled by following the reversed procedure of the process as shown in FIG. 6.

The backlight module 400 enables users to directly change the light source 412 with great convenience by simply taking out the bottom frame and the reflector sequentially. By this, the damage of the display panel 408, the multilayer optical film 410 and the light guide plate 414 caused by hitting and scratching during the exchanging process in the conventional backlight module is prevented.

In summary, the backlight module of the present invention at least offers the following advantages:

a. The light source can be easily exchanged after the backlight module is inverted and the bottom frame and the reflector are sequentially removed so that the present invention enables users to directly change the light source with great convenience by simply taking out the bottom frame and the reflector sequentially. Thus, the processing time can be reduced.

b. Forsaking the conventional assembling procedure of exchanging process, the present invention prevents the damage of the display panel, the multilayer optical film and the light guide plate caused by hitting and scratching during the exchanging process.

However, the present inventions are not limited in what are described above. For example, the light source 412 can be a fluorescent tube or a cold cathode fluorescent lamp (CCFL); the outer frame 402, the upper fame 404 and the bottom frame 406 can be made of metals or plastics; the display panel 408 can be a liquid crystal display panel. In addition, it will be understood to one skilled in the art that various coupling means can be applied to couple the outer frame 402 and the bottom frame 406. While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A backlight module, comprising:
   an outer frame;
   an upper frame disposed within, and being removably coupled with, the outer frame and having a receiving space;
   a bottom frame removably coupled to at least one of the outer frame and the upper frame for enclosing the receiving space;
   a reflector disposed in the receiving space and on the bottom frame; and
   at least a light source disposed in the receiving space and above the reflector;
   wherein when the backlight module is inverted, the bottom frame is separable from the at least one of the outer frame and the upper frame, so that the reflector can be removed, and the light source can be exchanged after both of the bottom frame and reflector are removed.

2. The backlight module according to claim 1, wherein the backlight module further comprises:
   a light guide plate disposed in the receiving space and above the reflector, for guiding the light reflected by the reflector;
   at least a lamp holder which is disposed in the receiving space and is adjacent to the light guide plate, for housing the light source;
   a multilayer optical film disposed above the lamp holder and the light guide plate within the upper frame, wherein the multilayer optical film functions to filter the light guided by the light guide plate; and
   a display panel disposed on the upper frame and the multilayer optical film within the outer frame, wherein the display panel receives the light filtered through the multilayer optical film so that the image is visible when the light reaches and penetrates the display panel.

3. The backlight module according to claim 2, wherein the display panel is a liquid crystal display panel.

4. The backlight module according to claim 1, wherein the light source is a cold cathode fluorescent lamp (CCFL).

5. The backlight module according to claim 1, wherein the upper frame has later sides extending down to substantially reach the bottom frame.

6. The backlight module according to claim 1, wherein the outer frame has another receiving space for receiving the upper frame, and the bottom frame is removably coupled to the at least one of the outer frame and the upper frame for enclosing the another receiving space.

7. A process of changing a light source in a backlight module, comprising:
   providing the backlight module that includes an outer frame, an upper frame, a bottom frame, a reflector and a light source; the upper frame being removably coupled with the outer frame and having a receiving space for receiving the reflector and the light source; the bottom frame being removably coupled to at least one of the outer frame and the upper frame for enclosing the receiving space; the reflector being disposed on the bottom frame; the light source being disposed above the reflector;
   inverting the backlight module and separating the bottom frame from the at least one of the outer frame and the upper frame;
   removing the reflector from the receiving space after removing the bottom frame; and
   exchanging the light source after removing the bottom frame and the reflector sequentially.

8. The process of changing the light source in a backlight module according to claim 7, wherein the backlight module further comprises:
   a light guide plate disposed in the receiving space and above the reflector, for guiding the light reflected by the reflector;
   at least a lamp holder which is disposed in the receiving space and is adjacent to the light guide plate, for housing the light source;
   a multilayer optical film disposed above the lamp holder and the light guide plate within the upper frame, wherein the multilayer optical film functions to filter the light guided by the light guide plate; and
   a display panel disposed on the upper frame and the multilayer optical film within the outer frame, wherein the display panel receives the light filtered through the multilayer optical film so that the image is visible when the light reaches and penetrates the display panel.

9. The process of changing the light source in a backlight module according to claim 8, wherein the display panel is a liquid crystal display panel.

10. The process of changing the light source in a backlight module according to claim 7, wherein the light source is a cold cathode fluorescent lamp (CCFL).

11. The process of changing the light source in a backlight module according to claim 7, wherein the upper frame has lateral sides extending down to substantially reach the bottom frame.

12. The process of changing the light source in a backlight module according to claim 7, wherein the outer frame has another receiving space for receiving the upper frame, and the bottom frame is removably coupled to the at least one of the outer frame and the upper frame for enclosing the another receiving space.

* * * * *